UNITED STATES PATENT OFFICE.

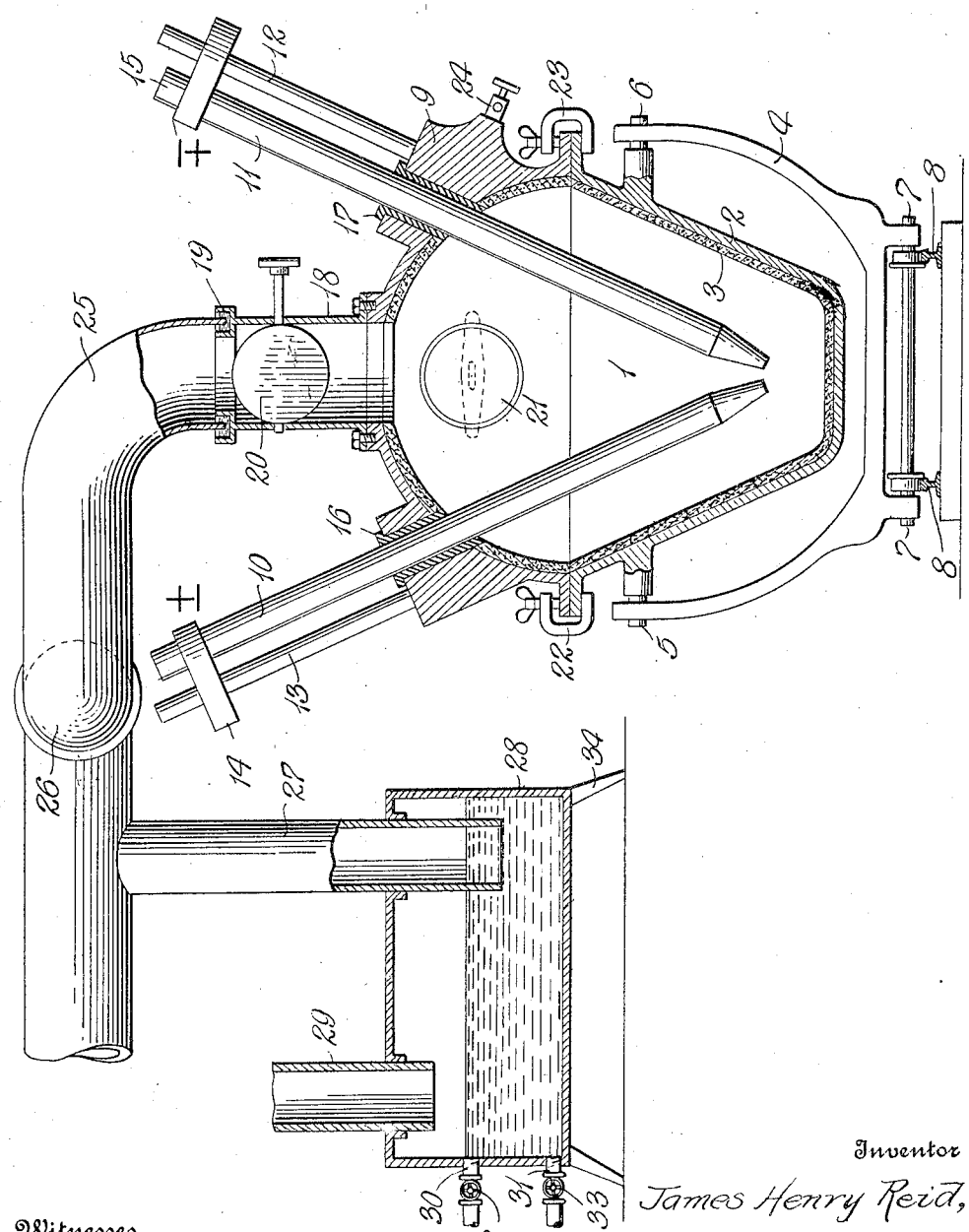

JAMES HENRY REID, OF NEWARK, NEW JERSEY, ASSIGNOR, BY MESNE ASSIGNMENTS, TO INTERNATIONAL NITROGEN CO., A CORPORATION OF DELAWARE.

PROCESS OF PROCURING AND SECURING PRODUCTS FROM CARBOHYDRATES.

1,327,737.    Specification of Letters Patent.    Patented Jan. 13, 1920.

Application filed January 13, 1914. Serial No. 811,851.

*To all whom it may concern:*

Be it known that I, JAMES HENRY REID, a citizen of the United States, residing at 352 Mulberry avenue, in the city of Newark, county of Essex, State of New Jersey, have invented certain new and useful Improvements in Processes of Procuring and Securing Products from Carbohydrates, of which the following is a specification.

This invention relates to a process for the production, distillation or sublimation by direct, fractional, destructive, or other means, of carbohydrates and production of products from residues and has for one of its objects the securing of the products of fractional or destructive distillation of carbohydrates such as wood, sawdust, wood tar or other substance capable of yielding carbon by the action of heat and the making of products with what would be the nonvolatile carbonaceous residues during the process of operation of the process, such as calcium carbid, which may be obtained by mixing calcium oxycompounds, such as calcium oxid, or substances capable of forming the same, such as calcium carbonate, with a carbohydrate, such as sawdust, and subjecting the mixture to the action of electricity as hereinafter set forth, and comprises specifically exposing a carbohydrate, for example, cellulose such as sawdust, to the action of electricity of sufficient volume and intensity to operate against the resistance of the substance employed and produce a temperature sufficient to evolve the product desired, or subjected to the action of electricity of progressively varying character so that varying degrees of temperature may be generated within the charge and various products evolved and secured, such as the separate constituents of wood tar, viz., wood alcohol, acetone, acetic acid, creosote, guiacol, etc., instead of a tar *per se*, or the whole of the products may be driven off as a composite composition and the constituents recovered thereafter by fractional distillation.

As an illustration of the invention and the manner in which it may be performed the production of wood tar, wood alcohol, acetone, creosote, guiacol, acetic acid, and other ingredients or substances evolved by the destructive and other distillation of wood together with the production of carbid, such as calcium carbid, will be taken, reference being directed to the accompanying drawing which diagrammatically indicates a form or character of apparatus adaptable to the operation of the process in which, The figure represents a transverse vertical view of an electric converter, furnace, or still, showing means for collecting, condensing and securing the volatile and volatilized products.

Referring to the drawing the numeral 1 represents an electric furnace in which the substances are converted, comprising the receptacle 2 provided with a lining 3 and supported by the support 4 by means of the trunnions 5 and 6 the said support 4 being provided with the roller bearing and shaft 7 resting on the track 8 whereby it may be rolled into position and therefrom after the materials in the receptacle 4 have been acted upon or converted. The receptacle 2 is provided with a top or cover 9 through which pass the electrodes 10 and 11 which are supported by the supports 12 and 13 through the insulation guides 14 and 15, the said electrodes passing through the cover 9 and provided with the insulation sleeves 16 and 17; from the cover extends the outlet 18 provided with the fluid seal 19 and the revolving damper 20. The upper section or cover 9 is also provided with a sealed feed inlet 21 the removable seal of which may be removed and replaced while supplying ingredients to the apparatus and closed during the operation thereof. The lower section 2 and the upper section 9 are secured to each other by means of the screw clamps 22 and 23. The upper section 9 of the converter is provided with a means 24 for providing an electrical connection to the converter opposite to that of the electrodes 10 and 11 and which means is of attachable and detachable nature. The outlet 18 with its fluid seal 19 communicates with a removable conduit 25, operating through the swinging joint 26. This conduit communicates with an outlet 27 leading to the reservoir and through which the condensed volatile products pass to the same, the reservoir 28 being provided with an outlet 29 for the permanent gases and whereby the said gases are conveyed to a reservoir (not shown). The reservoir 28 for the distillates is provided with the outlet 31 controlled by the valve 33 at the lower part thereof the outlet 30 controlled by valve 32 at a higher point for removal of lighter products when the reservoir contains water. The reservoir 28 is also provided with the legs or supports 34.

As an example of the process the production of calcium carbid from wood or sawdust and lime (calcium oxid) and the recovery of the tar or volatile products evolved during the action of electricity on the composition will be taken.

A mass of sawdust and calcium oxid in proportion of one hundred and fifty pounds of sawdust to 130 pounds of calcium oxid (pulverized) is thoroughly mixed and introduced into the receptacle 2 through the opening 21, it is advisable to mix with this composition about 5% of powdered coke in order to reduce the initial resistance and provide a means for starting the passage of the electric current through the mass at a comparatively low voltage and also provide a means for initially heating the mass through the agency of electricity and also provide a means for rendering the mass more or less porous so that the volatile products produced by the action of heat may be more readily evolved and discharged from the mixture. When the mixture has been introduced into the apparatus the supply opening 21 is sealed and a current of electricity passed through the mixture from the electrodes 10 and 11 to the receptacle 2, the carbonaceous lining of which constitutes the opposite electrode, by means of said electrodes and the contact 24 of the apparatus. As the current passes through the mixture of sawdust and lime the heat generated by the resistance of the ingredients causes the evoluction and distillation of various volatile products which condense and accumulate in reservoir 28 from which they may be recovered and the different ingredients afterward secured by fractional distillation or the electric current may be so regulated that each individual volatile ingredient produced by the destructive distillation of the sawdust in the converter 2 may be individually and separately secured during the process of destructive distillation, the temperature being regulated by moving the electrodes through the insulating sleeves 16 and 17. When all the volatile products have been distilled off the residual non-volatile carbonaceous matter associated with the lime is heated to a high degree through the passage of electricity and thereby converted into calcium carbid which is finally removed from the receptacle 2 by removing the clamps 22 and 23 and the cover 9 with its electrodes and inverting the receptacle on its trunnions 5 and 6, the apparatus being removed from the position and the cover 9 attached and operations performed as before. The outlet 18 is provided with a damper 20, which may be regulated by revolution to suitably check the outflow of volatile products evolved during the process of operation, the conduit 25 may be raised and disconnected from the fluid seal device 19 which seal is preferably maintained by means of a low fusible metal.

By exposing wood, such as sawdust to the action of controlled electric currents, the internal resistance will produce internal heat so that the substance will be transformed throughout in a regular and complete manner and will yield a larger percentage of products of more uniform character than in processes devised heretofore, so that the lighter volatile products are not disrupted or "cracked", thereby producing larger yields of uncontaminated products.

The non-volatile carbonaceous residue remaining after the evolution of the more volatile and less carbon-containing products produced comprises charcoal which reacts with the metal oxycompound, such as calcium carbonate or oxid at elevated temperatures and produces calcium carbid directly from the coked lime.

Other metal oxycompounds may be employed instead of calcium such as barium, or other metal, a carbid of which is desired, or any non-metal oxycompound, a carbid, or so-called carborundum may be produced.

The metal oxycompound may be metal oxid, such as calcium oxid, or substance capable of forming or yielding the same by the action of heat, such as calcium carbonate.

The varieties of cellulose which may be employed are wood, bark, or other cellular substance which may be finely divided like sawdust or in other available and practical forms for utilization.

The various volatile products produced by the action of electricity through the electrical resistance of the carbon-yielding substances operated on may be produced and collected as a composite composition and separated from each other by subsequent fractional distillation or each may be secured as it is produced by maintaining the electrical condition necessary and capable of producing each independently until each has been evolved and the character of electricity supplied altered to yield a next progressively higher carbon-containing product, whereby the products may be directly obtained separate from each other.

Silicon carbid may also be made by mixing silicon or silicates with the mineral hydrocarbon or carbon-yielding substance instead of metal carbid or any mixture of metal and non-metal carbid may be produced.

The term "carbid" employed herein is intended to include and does include broadly any non-volatile carbid of a metal or non-metal which may be produced by the action of carbohydrate and electricity on a compound of such metal or non-metal a carbid of which is desired, as herein set forth.

By inducing internal heat by electrical action, a more perfect and controlled transformation of the material acted upon into the product desired may be accomplished and the character of the product uniformly maintained without contamination, and also the yield of any individual product desired increased over that secured by any of the means of the prior art, which depends upon the application or employment of externally applied heat for bringing about the destructive distillation and fractional separation of similar corbonaceous substances and the production of similar products.

As the conductivity of the mass acted upon increases by reason of the increasing non-volatile carbon residue, the electrical current is correspondingly regulated to maintain a uniform and desired temperature. The conductivity of the initial charge may be augmented by associating the carbonaceous material carbohydrate, cellulose, wood, sawdust, etc., to be acted upon, with coke or other more conductive substances, to facilitate the starting of the operation by inducing internal heat, throughout the mass, whereby the transformation and evolution of volatile products may be obtained in the interior in an outward direction, thereby enhancing the porosity of the material and discharge of volatile products produced with decomposition.

Suitable fluxes may also be associated with the ingredients so that where the carbid is to be formed the fluxes may facilitate the fusion, reduction, carbonization, and manipulation of the metal, a carbid of which is desired, such as clay or aluminium silicate or double silicates such as feldspar, when calcium carbid is to be made.

Having now described my invention what I claim as new and desire to secure by Letters Patent is:—

1. The process of making fluid hydrocarbon, which comprises exposing a carbohydrate, while associated with a metal oxy-compound, to successive stages of heat induced therein by resistance therethrough of increments thereof to a current of electricity so varying in character as to successively yield products of progressively increasing carbon content, subjecting the carbohydrate and metal oxy-compound to selective electrical action until each desired product is produced and evolved, and finally securing such product by condensation.

2. The process of making fluid hydrocarbon, which comprises exposing a carbohydrate, while associated with a metal oxid, to successive stages of heat induced therein by resistance therethrough of increments thereof to a current of electricity so varying in character as to successively yield products of progressively increasing carbon content, subjecting the carbohydrate and metal oxid to selective electrical action until each desired product is produced and evolved, and finally securing such products by condensation.

3. The process of making fluid hydrocarbon, which comprises exposing a carbohydrate, while associated with a calcium oxy-compound, to successive stages of heat induced therein by resistance therethrough of increments thereof to a current of electricity so varying in character as to successively yield products of progressively increasing carbon content, subjecting the carbohydrate and calcium oxy-compound to selective electrical action until each desired product is produced and evolved, and finally securing such products by condensation.

4. The process of making fluid hydrocarbon, which comprises exposing a carbohydrate, while associated with calcium oxid to successive stages of heat induced therein by resistance therethrough of increments thereof to a current of electricity so varying in character as to successively yield products of progressively increasing carbon content, subjecting the carbohydrate and calcium oxid to selective electrical action until each desired product is produced and evolved, and finally securing such products by condensation.

5. The process of making fluid hydrocarbon, which comprises exposing cellulose, while associated with a metal-oxy-compound, to successive stages of heat induced therein by resistance therethrough of increments thereof to a current of electricity so varying in character as to successively yield products of progressively increasing carbon content, subjecting the cellulose and metal oxy-compound to selective electrical action until each desired product is produced and evolved, and finally securing such product by condensation.

6. The process of making fluid hydrocarbon, which comprises exposing cellulose, while associated with a metal oxid, to successive stages of heat induced therein by resistance therethrough of increments thereof to a current of electricity so varying in character as to successively yield products of progressively increasing carbon content, subjecting the cellulose and metal oxid to selective electrical action until each desired product is produced and evolved, and finally securing such products by condensation.

7. The process of making fluid hydrocarbon, which comprises exposing cellulose, while associated with a calcium oyx-compound, to successive stages of heat induced therein by resistance therethrough of increments thereof to a current of electricity so varying in character as to successively yield products of progressively increasing carbon content, subjecting the cellulose and calcium oxy-compound to selective electrical action until each desired product is evolved, and finally securing such products by condensation.

8. The process of making fluid hydrocarbon, which comprises exposing cellulose, while associated with calcium oxid, to successive stages of heat induced therein by resistance therethrough of increments thereof to a current of electricity so varying in character as to successively yield products of progressively increasing carbon content, subjecting the cellulose and calcium oxid to selective electrical action until each desired product is produced and evolved, and finally securing such products by condensation.

9. The process of making fluid hydrocarbon, which comprises exposing wood, while associated with a metal oxy-compound, to successive stages of heat induced therein by resistance therethrough of increments thereof to a current of electricity so varying in character as to successively yield products of progressively increasing carbon content, subjecting the wood and metal oxy-compound to selective electrical action until each desired product is produced and evolved, and finally securing such product by condensation.

10. The process of making fluid hydrocarbon, which comprises exposing wood, while associated with a metal oxid, to successive stages of heat induced therein by resistance therethrough of increments thereof to a current of electricity so varying in character as to successively yield products of progressively increasing carbon content, subjecting the wood and metal oxid to selective electrical action until each desired product is produced and evolved, and finally securing such products by condensation.

11. The process of making fluid hydrocarbon, which comprises exposing wood, while associated with a calcium oxy-compound, to successive stages of heat induced therein by resistance therethrough of increments thereof to a current of electricity so varying in character as to successively yield products of progressively increasing carbon content, subjecting the wood and calcium oxy-compound to selective electrical action until each desired product is produced and evolved, and finally securing such products by condensation.

12. The process of making fluid hydrocarbon, which comprises exposing wood, while associated with calcium oxid, to successive stages of heat induced therein by resistance therethrough of increments thereof to a current of electricity so varying in character as to successively yield products of progressively increasing carbon content, subjecting the wood and calcium oxid to selective electrical action until each desired product is produced and evolved, and finally securing such products by condensation.

13. The process of making fluid hydrocarbon, which comprises exposing sawdust, while associated with a metal oxy-compound, to successive stages of heat induced therein by resistance therethrough of increments thereof to a current of electricity so varying in character as to successively yield products of progressively increasing carbon content, subjecting the sawdust and metal oxy-compound to selective electrical action until each desired product is produced and evolved, and finally securing such product by condensation.

14. The process of making fluid hydrocarbon, which comprises exposing sawdust, while associated with a metal oxid, to successive stages of heat induced therein by resistance therethrough of increments thereof to a current of electricity so varying in character as to successively yield products of progressively increasing carbon content, subjecting the sawdust and metal oxid to selective electrical action until each desired product is produced and evolved, and finally securing such products by condensation.

15. The process of making fluid hydrocarbon, which comprises exposing sawdust, while associated with a calcium oxy-compound, to successive stages of heat induced therein by resistance therethrough of increments thereof to a current of electricity so varying in character as to successively yield products of progressively increasing carbon content, subjecting the sawdust and calcium oxy-compound to selective electrical action until each desired product is evolved, and finally securing such products by condensation.

16. The process of making fluid hydrocarbon, which comprises exposing sawdust, while associated with calcium oxid, to successive stages of heat induced therein by resistance therethrough of increments thereof to a current of electricity so varying in character as to successively yield products of progressively increasing carbon content, subjecting the sawdust and calcium oxid to selective electrical action until each desired product is produced and evolved, and finally securing such products by condensation.

17. The process of making carbid, which comprises gradually exposing a metal oxy-compound to the combined action of a carbohydrate and electricity passed through increments thereof until volatile carbonaceous products have been formed and evolved and thereafter increasing the flow of electric current until a carbid is formed.

18. The process of making calcium carbid, which comprises gradually exposing a calcium oxy-compound to the combined action of a carbohydrate and electricity passed through increments thereof until volatile carbonaceous products have been formed and evolved and thereafter increasing the flow of electric current until a carbid is formed.

In testimony whereof I affix my signature in the presence of two witnesses.

JAMES HENRY REID. [L. S.]

Witnesses:
O. W. PICKERING,
F. L. WHRITNER.